United States Patent [19]

Wallace

[11] 4,004,419
[45] Jan. 25, 1977

[54] APPARATUS FOR CONVERTING A HYDRAULIC PRESSURE SIGNAL TO A MECHANICAL MOTION

[76] Inventor: Ralph O. Wallace, 3224 E. 30 Place, Tulsa, Okla. 74114

[22] Filed: Feb. 17, 1976

[21] Appl. No.: 658,410

[52] U.S. Cl. .................................. 60/445; 60/452; 92/97
[51] Int. Cl.² ....................................... F16H 39/46
[58] Field of Search ................... 60/445, 452, 487; 92/97, 49

[56] References Cited
UNITED STATES PATENTS

| | | | |
|---|---|---|---|
| 2,161,439 | 6/1939 | Thoma | 60/452 X |
| 3,107,491 | 10/1963 | Kaup et al. | 60/452 |

*Primary Examiner*—Edgar W. Geoghegan
*Attorney, Agent, or Firm*—Head, Johnson & Chafin

[57] ABSTRACT

An apparatus for converting a hydraulic pressure signal to a mechanical motion in a way such that the amount of physical displacement of an element is directly proportional to the value of a hydraulic signal, the apparatus having a housing having a cylindrical cavity, a diaphragm within the housing dividing the cavity into a first portion and a second portion, the second portion of the cavity having walls configured as a frustocone, the base of the cone being the inner surface of the diaphragm, a shaft slidably positionable in the housing, the inner end of the shaft connecting the diaphragm so that hydraulic pressure applied to the rearward surface of the diaphragm displaces the shaft, the diaphragm contacting the conical walls as it is moved forward by increased hydraulic pressure, decreasing the effective area of the diaphragm such that the displacement of the shaft is substantially directly proportional to the pressure of the hydraulic signal.

Further, the invention includes a hydraulic system for providing a constant utilizing the above described apparatus to control output of a variable volume pump.

12 Claims, 4 Drawing Figures

APPARATUS FOR CONVERTING A HYDRAULIC PRESSURE SIGNAL TO A MECHANICAL MOTION

BACKGROUND AND OBJECTS OF THE INVENTION

In many industrial applications a variable volume positive displacement pump is utilized to provide hydraulic energy to drive mechanical devices, such as a hydraulic motor. Variable volume positive displacement pumps are driven by prime movers, such as engines or motors. In many applications it is desirable that the output of a variable volume positive displacement pump be maintained as near as possible to the horsepower delivering capabilities of the prime mover or to some lower pre-selected horsepower. That is, if the pressure of fluid at the discharge of the pump increases, the volume must be decreased otherwise the horsepower input requirement to the pump must increase. Correspondingly, if the pressure decreases, the volume must be increased otherwise the horsepower input to the pump will diminish. In some applications it is desirable that the maximum pressure of the pump be obtained without exceeding the maximum horsepower capability of the prime mover.

In order to vary the output of a positive displacement hydraulic pump it is necessary to mechanically vary some control of the pump, such as a control arm extending from the pump. The present invention is directed toward a control device for controlling a hydraulic pump in such a way as to maintain substantially constant hydraulic horsepower output.

It is therefore an object of this invention to provide a control device for converting a hydraulic pressure signal to a mechanical motion, the mechanical displacement being directly proportional to the value of the hydraulic signal.

More particularly, an object of this invention is to provide a hydraulic system for producing a constant horsepower input to a hydraulic fluid utilizing apparatus, such as a hydraulic motor, the system including a prime mover connected to a variable volume positive displacement pump and a controller for sensing the pressure at the output of the pump and for controlling the pump to increase the volume when the pressure drops and to decrease the volume as the pressure rises in a linear way so as to maintain the horsepower output, and therefore the horsepower input requirements of the pump, substantially constant.

These general objects as well as other and more specific objects of the invention will be fulfilled in the following description and claims, taken in conjunction with the attached drawings.

DESCRIPTION OF THE VIEWS

SUMMARY OF THE INVENTION

An apparatus is described for converting a hydraulic pressure signal to a mechanical motion in the form of a linear displacement of a shaft, the shaft being displaced proportional to the value of the hydraulic signal, the apparatus including a housing having a diaphragm mounted in a cavity in the housing, the walls of the cavity to one side of the diaphragm being conical with a hydraulic signal applied to the rearward side of the diaphragm, the diaphragm contacting the conical wall as it is moved forward by increased hydraulic pressure, the effective cross-sectional area of the diaphragm being thereby decreased by the conical wall so that the displacement of the shaft is proportional to the hydraulic pressure input.

A constant horsepower hydraulic system is disclosed including a prime mover, a variable volume positive displacement pump driven by the prime mover, the pump having a control arm whereby the volume of the pump may be varied, the control mechanism above described being connected to the control arm and the output of the hydraulic pump being connected to the control device such that the control device actuates the pump control arm to increase the pump volume when the pressure decreases and decreases the pump volume when the pressure increases, to thereby maintain a substantially constant horsepower output of the pump.

DETAILED DESCRIPTION

Figure 1:
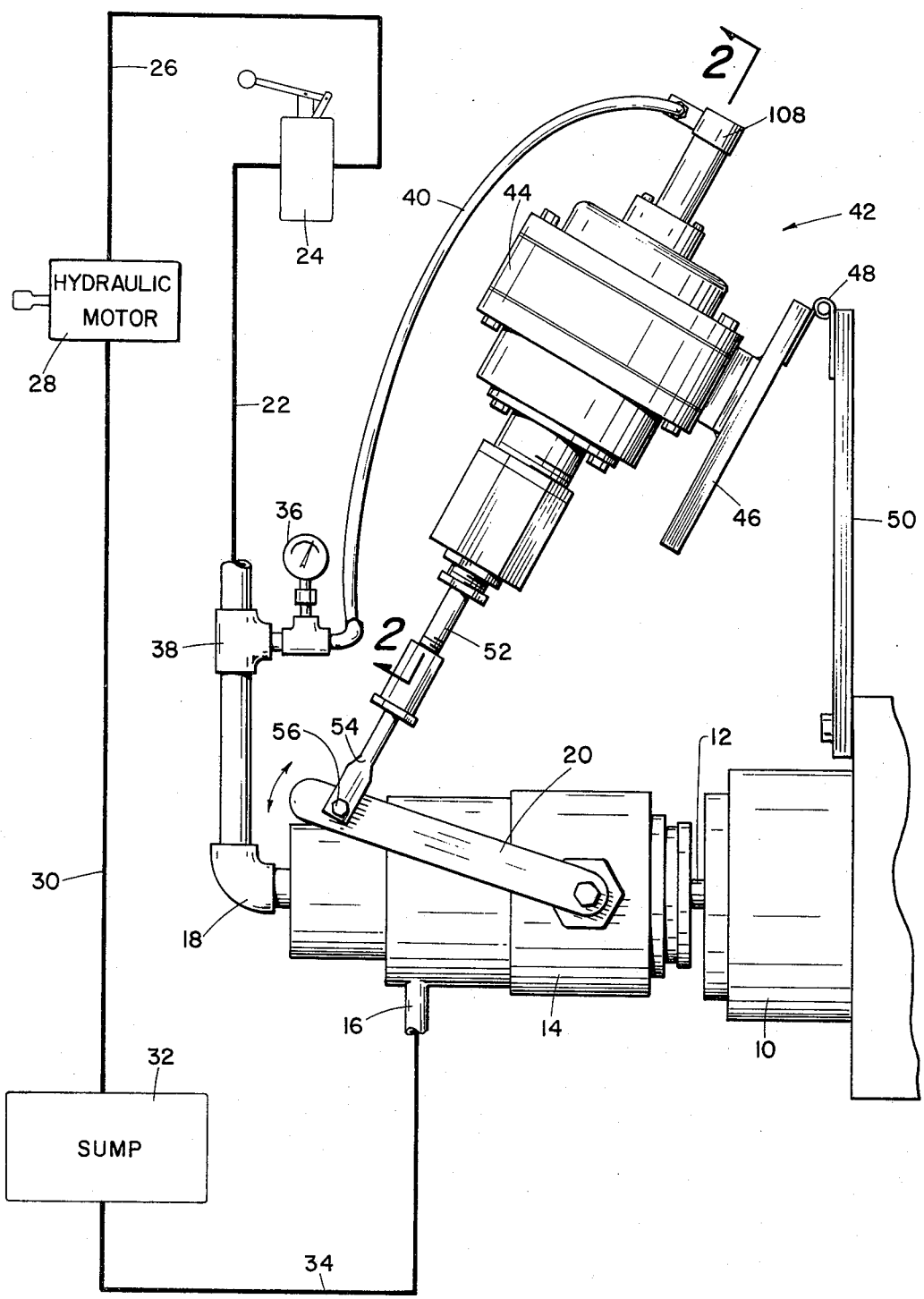
FIG. 1 is a diagrammatic arrangement of a hydraulic system for providing a constant horsepower input to a hydraulic motor utilizing a variable volume positive displacement pump driven by a prime mover only a portion of the prime mover being shown, the control device of this invention being shown in elevation.

Referring to the drawings and first to FIG. 1, a hydraulic system is disclosed including a prime mover 10, only a portion of which is illustrated, the prime mover having an output shaft 12. The prime mover 10 may be an engine or motor or any other source of rotative power to drive shaft 12. Supported adjacent the prime mover 10 is a variable volume positive displacement hydraulic pump 14 having an input shaft connected to the prime mover shaft 12. Pump 14 includes a fluid inlet 16 and a fluid outlet 18. In addition, pump 14 includes a control arm 20, the angular position of which varies the volume of the pump. There are many different types of variable volume positive displacement pumps, an example being an axialpiston pump having a cam reaction plate (not shown). The amount each piston is displaced on each revolution of shaft 12 depending on the tilt of the cam reaction plate which in turn is determined by the angular position of control arm 20. Thus, the control arm 20 selects the pump displacement.

The output from pump 14 is connected by a conduit 22, through a control valve 24 and conduit 26 to a hydraulic motor 28. The hydraulic motor may be any type of device which converts hydraulic energy into mechanical motion. From the hydraulic motor 28 a conduit 30 conducts the fluid to a sump 32 which acts as a fluid reservoir. Conduit 34 leads from the sump to the pump input 16. The pressure at pump outlet 18 may be indicated by a gauge 36 connected to a tee fitting 38 in conduit 22. The pump output pressure is communicated by a small conduit 40 to a control device generally indicated by the numeral 42.

The control device 42 includes a housing 44 supported on a base 46 which is connected by hinge 48 to a stanchion 50 affixed to prime mover 10. Control 42 has a longitudinally positionable output shaft 52 which is threaded at the outer end. Received on the threaded shaft 52 is a clevis 54 which is connected to the outer end of the control arm 20 by means of a bolt 56.

The function of controller 42 is to actuate output shaft 52 to change the angular position of arm 20 so that the horsepower delivered by the hydraulic fluid flowing through conduit 22 and 26 to the motor 28 remains substantially constant regardless of the back pressure generated by the motor 28. That is, when the motor 28 offers decreased resistance, allowing increased hydraulic fluid flow and thereby dropping the pressure in conduit 22, controller 42 pivots arm 22 in the direction to increase the volume of pump 14. When the pressure in conduit 22 increases, controller 42, by means of output shaft 52, rotates arm 20 in the direction to decrease the output. In this way the horsepower value of the hydraulic energy delivered to hydraulic motor 28 remains substantially constant and thereby horsepower required by prime mover 10 remains substantially constant.

Figure 2:
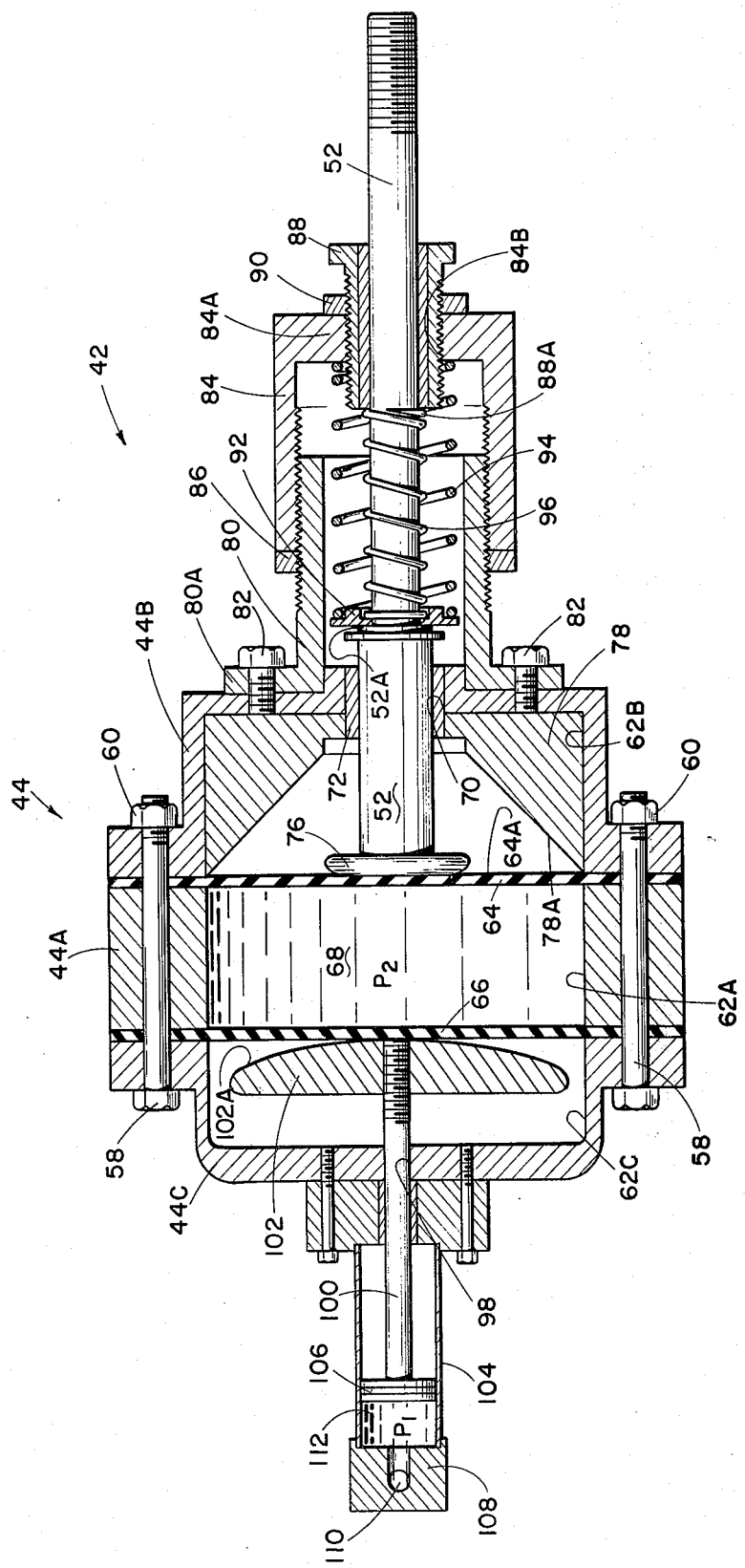
FIG. 2 is a cross-sectional view of the control device taken along the line 2—2 of FIG. 1, the device being shown in the position of the parts when the pump output pressure is zero.

Referring to FIG. 2 the details of one embodiment of the controller 42 are illustrated. Housing 44 consists of three basic components: a central cylindrical portion 44A; a forward portion 44B; and a rearward portion 44C. The portions are held together by bolts 58 and nuts 60. Each of the body portions have a cylindrical cavity therein, the cavities being designated 61A, 62B, 62C respectively. Positioned between the body portions 44A and 44B is an elastomeric diaphragm 64. Between body portions 44A and 44C is an isolating diaphragm 66 also of elastomeric material. Diaphragms 64 and 66 are parallel to each other and the area therebetween is filled with hydraulic fluid 68.

The cavity of forward body portion 44B has an axial opening 70 therein which receives a bushing 72. Positioned in the bushing 72 is the longitudinally positionable output shaft 52 having an enlarged diameter head portion 76 on the inner end which engages the forward surface 64A of diaphragm 64.

Positioned within housing forward portion 44B is a member 78 having a frustoconical surface 78A coaxial with shaft 52. The conical surface 78A is important to the functioning of the device, which importance will be discussed in detail subsequently.

Positioned on the forward end of housing portion 44B is a spring enclosure 80 which includes a flange portion 80A, the spring enclosure being held to the body forward portion by bolts 82. Threadably received on the outer end of the spring enclosure is a spring retainer 84. A lock nut 86 threaded on the spring enclosure maintains the spring retainer in its selected threadable position. The outer end of the spring enclosure includes an integral flange portion 84A having a threaded opening 84B therein, coaxial with the shaft 52. An externally threaded bushing 88 is positioned in the threaded opening 84B. A lock nut 90 threaded on the bushing engages the forward end of the spring retainer to maintain the bushing 88 in its selected position.

Shaft 52 has a shoulder 52A which receives a spring follower 92. Positioned between the spring follower and the inner surface of spring retainer flange 84A is a compression spring 94. The function of spring 94 is to urge the shaft 52 in the direction towards diaphragm 64. The amount of compression of spring 64 is adjusted by the threadable position of spring retainer 84.

A smaller diameter compression spring 96 extends between the inner end 88A of bushing 88 and spring follower 92. The smaller diameter spring 96 is also in compression urging the shaft 52 towards diaphragm 64. The amount of compression is adjustable by threadably positioning bushing 88.

Rearward housing portion 44C has an opening 98 therein which is coaxial with opening 70 in the forward housing portion 44B. Slidably positioned in opening 98 is a rod 100 and attached to its inner end, within housing 44C is a diaphragm engaging member 102 having a spherical forward surface 102A.

Received on the exterior of rearward housing portion 44C is a cylinder 104 having a piston 106 therein which is affixed to the outer end of rod 100. A fitting 108 closes the outer end of cylinder 104 and has an opening 110 therein which communicates with conduit 40 (see FIG. 1). Hydraulic fluid 112 fills the interior of cylinder 104 between the fitting 108 and piston 106, the hydraulic fluid being in communication through conduit 40 with the output of variable displacement pump 14.

OPERATION

With prime mover 10 delivering a preselected horsepower output by shaft 12 pump 14 is energized to produce a proportional recoverable energy output by the flow of hydraulic fluid from outlet 18. This hydraulic energy is convertible back to mechanical energy by hydraulic motor 28 or some similar device. Controller 42 can be set to regulate variable volume pump 14 so as to maintain the preselected horsepower delivery to hydraulic motor 28.

With the prime mover 10 running a given volume of fluid will be displaced by pump 14, the fluid moving through outlet 18, conduit 22, valve 24, conduit 26, hydraulic motor 28 and conduit 30 into a sump. From the sump by means of conduit 34 fluid is received back into the hydraulic pump. If the sump 32 is at atmospheric pressure, the energy delivered by the pump is reflected by the volume and pressure of hydraulic fluid at outlet 18, which energy is dropped as the fluid passes through motor 28.

Before prime mover 10 is energized to actuate pump 14, diaphragm 64 and controller 42 will be in the position shown in FIG. 2 and normally shaft 52 and pump control arm 20 will be positioned so that the pump will produce the maximum volume displacement per shaft revolution. After the pump is started this maximum volume delivery immediately raises the pressure at outlet 18. This pressure is applied by conduit 40 to cylinder 104, pushing piston 106 and rod 100 forward so that contact head 102 engages isolating diaphragm 66. This applies hydraulic pressure to fluid 68 which, in turn, is applied to diaphragm 64, moving it forward to displace shaft 52. As shaft 52 is displaced it moves the pump control arm 20 to reduce the volume output. This action takes place until a null point is reached, that is, the volume is reduced until the pressure is stablized to the level where no further movement of diaphragm 64 occurs. This represents the maximum volume of fluid flow at a preselected pressure to maintain a constant horsepower delivery to hydraulic motor 28 from the hydraulic pump.

As the resistive force applied to retard the movement of hydraulic motor 20 increases, the volume of fluid flow through the motor will decrease, causing the pressure at pump outlet 18 to increase. This increased pressure is reflected by conduit 40 and through the hydraulic system to diaphragm 64, axially displacing shaft 52 to reduce the volume output of pump 44 to thereby permit the pressure to fall back. When the pressure drops the reverse effect takes place, the shaft 52 being moved to increase the volume output of pump 14 to thereby raise the fluid pressure at outlet 18. Thus, the control device 42 functions to regulate the positive displacement of pump 14 so as to maintain substantially constant horsepower output regardless of the change of load of the hydraulic device connected to the pump.

Figures 3, 4:
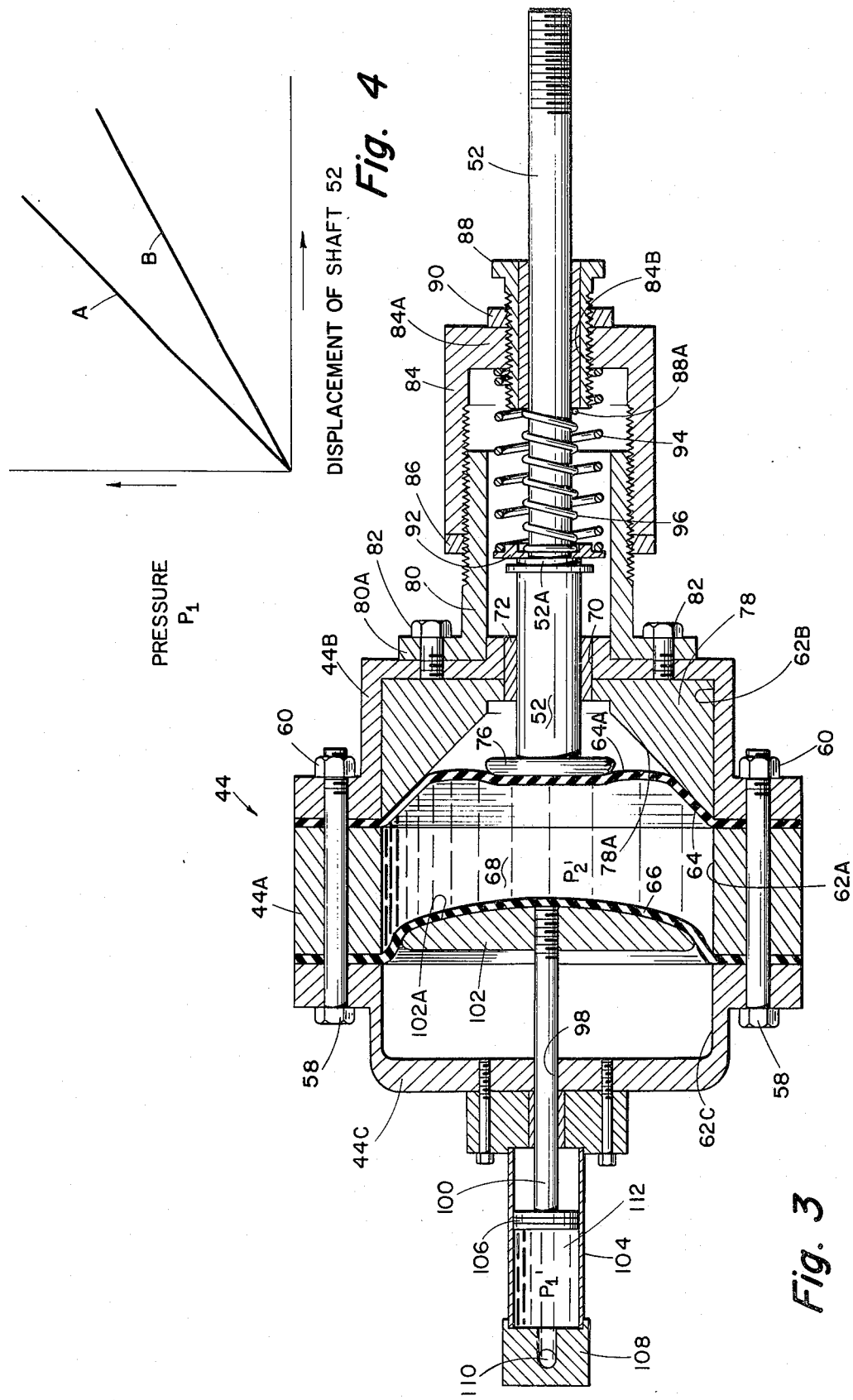
FIG. 3 is a cross-sectional view as shown in FIG. 2, but showing the control device reacting under pressure output of a hydraulic pump.
FIG. 4 is a graph showing the relationship of the displacement of the control device output shaft to the output pressure of the pump.

The essence of the invention is the provision of conical surface 78A in the control device 42. As the pressure increases diaphragm 64 moves inwardly contacting the conical surface 78A. As this conical surface is contacted the effective area subject to the pressure of hydraulic fluid 68 decreases as shown in FIG. 3. If the surface 78A is conical, that is, if the displacement of shaft 52 causes an arithmatic change in the effective area of diaphragm 64 then the controller 42 functions in a linear way, the displacement of shaft 52 being directly proportional to hydraulic fluid pressure supplied to piston 106.

It can be seen that in its simplest embodiment conduit 40 could be connected directly to the interior 62A of housing intermediate portion 44A so that hydraulic pressure is applied directly to the rearward surface of diaphragm 64. In this arrangement diaphragm 66 would be replaced by a solid wall. The illustrated arrangement, however, is prefered since it isolates the hydraulic fluid system from diaphragm 64 and, in addition, it provides means for obtaining a mathematical relationship between the pressure of hydraulic fluid at outlet 18 and the actuation of the diaphragm 64. It can be seen that the displacement of diaphragm 64 by a preselected pressure level in conduit 40 is determined by the ratio of the diameter of piston 106 to the diameter of diaphragm 64. By this arrangement the same housing portions 44A, 44B and 44C may be employed, utilizing the same diaphragms 64 and 66, for a wide range of fluid control applications by selecting varying sizes of cylinders.

FIG. 4 shows the displacement of shaft 52 plotted as the abscissa and the fluid pressure P1 applied to piston 106 plotted as the ordinate, showing that the relationship is a straight line. The slope of the lines A and B is selectable by the resistive force of springs 94 and 96. Line B illustrates the displacement when the force of springs 94 and 96 is greater than with line A. This force is selected by threadably positioning spring retainer 84 and bushing 88. In practice, the rough adjustment is made by positioning spring retainer 84 with a final adjustment by use of bushing 88.

FIG. 1 illustrates one application of the control device 42. It can be seen that many other applications may be had for a control device providing a linear displacement directly proportional to the value of an applied hydraulic signal. The expression "hydraulic signal" includes the use of any fluid, incluing liquid, gas and vacuum. Vacuum may be applied as a signal in the space between diaphragm 64 and wall surface 78A.

While the invention has been described with a certain degree of particularity it is manifest that many changes may be made in the details of the device and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element or step thereof is entitled.

What is claimed:

1. An apparatus for converting a hydraulic pressure signal to a mechanical motion, the mechanical displacement being proportional to the value of the hydraulic signal, comprising:
   a housing having a cylindrical cavity therein;
   a cylindrical diaphragm of impervious flexible material dividing the cavity into a first cylindrical chamber and a second chamber, the second chamber being defined by a truncated conical wall coaxial with the first chamber, the forward surface of the diaphragm forming the base of said conical second chamber, the housing having an opening therein coaxial with said second chamber;
   means of imparting hydraulic pressure to said first cavity and thus to the rearward surface of said diaphragm;
   a longitudinally positionable output shaft slidably received in said housing opening, the inner end of said output shaft contacting said diaphragm forward surface whereby as said diaphragm is displaced by hydraulic fluid pressure said shaft is longitudinally displaced; and
   spring means urging said shaft towards said diaphragm, said diaphragm contacting said conical wall of said forward cavity as it is moved forward by hydraulic pressure applied to the rearward surface thereof, the effective cross-sectional area of said diaphragm being thereby linearly decreased as the diaphragm is moved forwardly by increased hydraulic pressure.

2. An apparatus according to claim 1 including:
   an isolating diaphragm parallel to and spaced rearwardly from said first mentioned diaphragm forming a third chamber within said housing cavity between the diaphragms, said third chamber being filled with hydraulic fluid.

3. An apparatus according to claim 2 wherein said housing has a second axial opening therein coaxial with said first chamber, said conical chamber and said output shaft;
   an actuating shaft reciprocally positioned in said second axial opening, the inner end of said actuating shaft contacting said isolating diaphragm;
   a hydraulic cylinder affixed to said housing and coaxially receiving said actuating shaft; and
   a piston in said hydraulic cylinder affixed to the outer end of said actuating shaft, the cylinder having a fluid inlet opening adjacent the outer end thereof whereby hydraulic fluid pressure is applied as said means of imparting hydraulic pressure to the rearward surface of said diaphragm.

4. An apparatus according to claim 1 wherein said spring means is adjustable.

5. An apparatus according to claim 1 including:
   a tubular spring enclosure positioned on the forward end of said housing coaxial with said output shaft;
   a tubular spring retainer telescopically and threadably received on the outer end of said spring enclosure, the spring retainer having an axial opening therein slidably receiving said output shaft and providing a spring engaging shoulder, said output shaft having an enlarged diameter spring follower thereon encompassed within said spring enclosure and spring retainer, said spring means comprising a coiled spring received in compression between the shaft spring follower and said spring retainer shoulder, the tension of said spring being adjusted by threadably positioning said spring retainer relative to said spring enclosure.

6. An apparatus according to claim 3 including:
a contacting pad affixed to the inner end of said actuating shaft within said housing second chamber, the contacting pad having a forward isolating diaphragm contacting surface configured substantially as a segment of a sphere.

7. A hydraulic system for a hydraulic motor having a fluid inlet and a fluid outlet, comprising:
1. a prime mover having an output shaft;
2. a variable volume positive displacement pump having an input shaft connected to said prime mover output shaft, the pump having a fluid inlet and a fluid outlet and having a control arm, the angular position of which varies the volume output of the pump;
3. a reservoir having fluid connection with said hydraulic motor outlet and said pump inlet; and
4. a controller for actuation of the pump control arm having:
   a. a housing supported adjacent said pump and having a cylindrical cavity therein;
   b. a cylindrical diaphragm of impervious flexible material dividing the cavity into a first chamber and a second chamber, the second chamber being defined by a truncated conical wall, the forward surface of the diaphragm forming the base of said conical second chamber, the housing having an opening therein coaxial with said second chamber;
   c. a longitudinally positionable output shaft slidably received in said housing opening, the inner end of said output shaft contacting said diaphragm forward surface whereby as said contacting and diaphragm forward surface whereby as said diaphragm is displaced by hydraulic fluid pressure said shaft is longitudinally displaced, the outer end of said output shaft being pivotally connected to said pump control arm; and
   d. spring means urging said shaft towards said diaphragm, said diaphragm contacting said conical wall of said forward cavity as it is moved forward by hydraulic pressure applied to the rearward surface thereof, the effective cross-sectional area of said diaphragm being thereby linearly decreased as the diaphragm is moved forwardly by increased hydraulic pressure;
5. a conduit connecting said pump output and said hydraulic motor fluid inlet;
6. a conduit connecting said hydraulic motor output to said reservoir; and
7. a conduit connecting said pump output to said controller housing first chamber whereby the output pressure of said pump is imparted to said controller first cavity and thus to the rearward surface of said diaphragm;
whereby as the pressure at said pump output decreases said spring urges said controller output shaft and said diaphragm towards said first cavity, the movement of said output shaft and control arm serving to increase the fluid volume, and as the pressure at the output of said pump increases, said diaphragm reacts to move said controller output shaft and pump control arm to reduce the volume of said pump, to thereby maintain substantially constant horsepower output to said hydraulic motor regardless of changes in the pressure of fluid delivered by said pump to said motor.

8. An apparatus according to claim 7 including:
an isolating diaphragm parallel to and spaced rearwardly from said first mentioned diaphragm forming a third chamber within said housing cavity between the diaphragms, said third chamber being filled with hydraulic fluid.

9. An apparatus according to claim 8 wherein said housing has a second axial opening therein coaxial with said first chamber, said conical chamber and said output shaft;
an actuating shaft reciprocally positioned in said second axial opening, the inner end of said actuating shaft contacting said isolating diaphragm;
a hydraulic cylinder affixed to said housing and coaxially receiving said actuating shaft; and
a piston in said hydraulic cylinder affixed to the outer end of said actuating shaft, the cylinder having a fluid inlet opening adjacent the outer end thereof whereby hydraulic fluid pressure is applied as said means of imparting hydraulic pressure to the rearward surface of said diaphragm.

10. An apparatus according to claim 7 wherein said spring means is adjustable.

11. An apparatus according to claim 7 including:
a tubular spring enclosure positioned on the forward end of said housing coaxial with said output shaft;
a tubular spring retainer telescopically and threadably received on the outer end of said spring enclosure, the spring retainer having an axial opening therein slidably receiving said output shaft and providing a spring engaging shoulder, said output shaft having an enlarged diameter spring follower thereon encompassed within said spring enclosure and spring retainer, said spring means comprising a coiled spring received in compression between the shaft spring follower and said spring retainer shoulder, the tension of said spring being adjusted by threadably positioning said spring retainer relative to said spring enclosure.

12. An apparatus according to claim 9 including:
a contacting pad affixed to the inner end of said actuating shaft within said housing second chamber, the contacting pad having a forward isolating diaphragm contacting surface configured substantially as a segment of a sphere.

* * * * *